(12) United States Patent
Ramanathan et al.

(10) Patent No.: US 7,263,556 B1
(45) Date of Patent: Aug. 28, 2007

(54) SYSTEM AND METHOD OF ENHANCING SERVER THROUGHPUT BY MINIMIZING TIMED-WAIT TCP CONTROL BLOCK (TWTCB) SIZE

(75) Inventors: Venkataraman Ramanathan, Redmond, WA (US); Nk Srinivas, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 602 days.

(21) Appl. No.: 09/637,400

(22) Filed: Aug. 11, 2000

(51) Int. Cl.
*G06F 15/16* (2006.01)
*G06F 15/173* (2006.01)
(52) U.S. Cl. .................. 709/227; 709/223; 709/228
(58) Field of Classification Search .......... 709/233, 709/232, 234, 235, 236, 223, 227, 228
See application file for complete search history.

(56) References Cited

U.S. PATENT DOCUMENTS

| | | | | |
|---|---|---|---|---|
| 5,892,925 A | * | 4/1999 | Aditya et al. | 709/230 |
| 5,978,849 A | * | 11/1999 | Khanna | 709/227 |
| 6,035,418 A | * | 3/2000 | Recio et al. | 714/18 |
| 6,295,557 B1 | * | 9/2001 | Foss et al. | 709/224 |
| 6,298,380 B1 | * | 10/2001 | Coile et al. | 709/227 |
| 6,338,054 B1 | * | 1/2002 | Kitamura | 707/1 |
| 6,598,081 B1 | * | 7/2003 | Coile et al. | 709/227 |

OTHER PUBLICATIONS

Information Sciences Institute, University of Southern California, Transmission Control Protocol, Sep. 1981, http://www.cis.ohio-state/edu/htbin/rfc793.html (last visited Jun. 20, 2002) 81 pages.

* cited by examiner

*Primary Examiner*—Ario Etienne
*Assistant Examiner*—Hussein El-chanti
(74) *Attorney, Agent, or Firm*—Wolf, Greenfield & Sacks, P.C.

(57) ABSTRACT

A system and method to improve server throughput is presented. This system and method stores only selected information from the server's TCP/IP Transmission Control Block (TCB) in the time-wait state. This allows for the release of a portion of the non-paged pool (NPP) memory that was used by the TCB to previously service the now closing connection. This newly released NPP memory may then be used by the server to service additional TCP/IP connections, thus improving the throughput of the server. This small time-wait TCB (TWTCB) stores only an amount of information necessary to uniquely identify the connection to which it relates. Information that was stored to allow servicing of an active connection, but that is not needed to merely identify the connection, is not kept in the TWTCB. By maintaining information that allows for a unique identification of a closing connection, late routed packets for that connection are prevented from establishing a new connection with the server. By minimizing the amount of information to accomplish this unique identification, additional connections to new client may be established without reaching a NPP memory limit.

17 Claims, 2 Drawing Sheets

SYSTEM AND METHOD OF ENHANCING SERVER THROUGHPUT BY MINIMIZING TIMED-WAIT TCP CONTROL BLOCK (TWTCB) SIZE

TECHNICAL FIELD

This invention relates generally to systems and methods for improving the throughput of servers, and, more particularly, relates to systems and methods for improving throughput by managing system resources for TCP/IP connections.

BACKGROUND OF THE INVENTION

Despite early skepticism, businesses have now fully embraced the Internet as a vehicle critical to the success of their continued operations. The explosion of e-commerce and the emergence of business to business (B2B) technologies and industry utilization, as well as the proliferation of personal computers (PCs) have galvanized the business mindset and the consuming public to the use of the Internet as an everyday tool for commerce. The explosion of such use has pushed the limits of Internet technology faster and further than heretofore thought possible.

With many corporate Web sites getting millions of hits per day, the choice of server software to handle these transactions can be critical. Corporate servers that do not respond crisply under heavy loads often slow down network connections, deny service for potential customers, and even cause network failures due to the sheer volume of business which potential customers are attempting to conduct on the server. Such performance slow downs and denial of service problems tend to increase customer dissatisfaction, reduce sales, and diminish the possibility for repeat customers. Additionally, denial of service and complete network failures caused by heavy volume translate directly into lost sales and lost business opportunities. Therefore, in this new economy server performance is critical to the long-term viability of nearly every business concern.

Lying at the core of the explosion of the popularity and usage of the Internet is the server and browser communication protocol known as hypertext transfer protocol (HTTP). HTTP is the network protocol used to deliver virtually all files and other data, known collectively as resources, on the worldwide Web. These resources include HTML files, image files, query results, etc. This network protocol typically takes place through TCP/IP sockets. As with other network protocols, HTTP utilizes a client-server model. In this model, an HTTP client (such as a consumer) opens a TCP/IP connection and sends a request message to an HTTP server (e.g. a corporate server).

Upon establishment of the TCP/IP connection, the server creates a data structure known as a TCP Transmission Control Block (TCB) that contains all of the connection information for the client. For example, to identify the separate data streams that TCP may handle, TCP provides a port identifier. Since port identifiers are selected independently by each TCP they might not be unique. To provide for unique addresses within each TCP, an Internet address is concatenated identifying the TCP with a port identifier to create a socket that will be unique throughout all networks connected together. A connection may then be fully specified by the pair of sockets at the ends, and a local socket may participate in many connections to different foreign sockets. A connection is specified in the OPEN call by the local port and foreign socket arguments. In return, the TCP supplies a (short) local connection name by which the user refers to the connection in subsequent calls.

As may now be apparent, there are several pieces of information that must be remembered about a connection. As mentioned above, this information is stored in a data structure called a Transmission Control Block (TCB) that utilizes the (short) local connection name as a pointer to the TCB for its particular connection. A connection is initiated by the rendezvous of an arriving segment containing a SYN and a waiting TCB entry each created by a user OPEN command. Unfortunately, all TCBs existing for all connections must be searched until the correct TCB is found. Among the variables stored in the TCB are the local and remote socket numbers, the security and precedence of the connection, pointers to the user's send and receive buffers, pointers to the retransmit queue and to the current segment. In addition several variables relating to the send and receive sequence numbers are stored in the TCB. These send sequence variables include SND.UNA (send unacknowledged), SND.NXT (send next), SND.WND (send window), SND.UP (send urgent pointer), SND.WL1 (segment sequence number used for last window update), SND.WL2 (segment acknowledgment number used for last window update), and ISS (initial send sequence number). The receive sequence variables include RCV.NXT (receive next), RCV.WND (receive window), RCV.UP (receive urgent pointer), and IRS (initial receive sequence number).

As a result of storing this and other data, the size of a typical TCB is on the order of 400 to 500 bytes of non-paged-pool (NPP) memory. With a limit for the non-paged-pool memory set at 128 Mbytes in a typical server, the space for maintaining TCBs is limited to approximately 100 Mbytes. This, in turn, limits the number of TCBs to approximately 250,000 TCBs before the NPP limit is exceeded.

A connection progresses through a series of states during its lifetime. The states are: LISTEN, SYN-SENT, SYN-RECEIVED, ESTABLISHED, FIN-WAIT-1, FIN-WAIT-2, CLOSE-WAIT, CLOSING, LAST-ACK, TIME-WAIT, and the fictional state CLOSED. CLOSED is fictional because it represents the state when there is no TCB, and therefore, no connection. The TIME-WAIT state represents waiting for enough time to pass to be sure the remote TCP received the acknowledgment of its connection termination request. That is, when a connection closes in the graceful-close mode, the corresponding TCB needs to be kept in this Time-Wait state to avoid late-routed packets from establishing new connections on the same connection (Source IP, Source Port, Destination IP, Destination Port). According to current standards, the number of seconds for which each TCB needs to be held in Time-Wait state before being deleted is controlled by a registry parameter having a default of 240 seconds. This time period is set at 60 seconds for the SPECWeb96 performance measurements for the server. As the server attempts to operate at higher throughputs on SPECWeb96, the NPP limit is quickly reached. In fact, with the Time-Wait state time reduced to only 60 seconds, the NPP limit is reached with a throughput of only 4200 HTTP messages per second. This limits the ability of the server to operate at higher throughput rates that enable the servicing of additional connections, which limits the amount of business that may be conducted via that server.

There exists, therefore, a need in the art to enable higher throughputs while still maintaining Time-Wait TCB to ensure connection termination integrity by preventing late-routed packets from establishing another connection when, in fact, that packet's connection has already been closed.

SUMMARY OF THE INVENTION

The methods of the instant invention increase the performance throughput of servers that service HTTP transactions via TCP/IP connections. This throughput enhancement is accomplished by reducing of the amount of information, and hence the amount of NPP (non-paged pool) memory resources, needed to prevent late-routed TCP/IP packets from establishing a new connection to a server that has recently closed its connection with the packet's source. This reduction is made possible by the instant invention by identifying the smallest amount of the particular pieces of information necessary to uniquely identify the recently closed connection, and by storing only that information as a Time-Wait TCB (TWTCB) separately from the active TCBs. The remainder of the TCB memory that was allocated to handle the connection while active is freed back into the local cache (the Slist) for reuse by the server. The small TWTCBs of the instant invention are maintained for the required amount of time, but since they require much less NPP memory, the total throughput of the server is increased before the NPP limit is reached. In a preferred embodiment, by reducing the amount of NPP used by the TWTCB from the current 400-500 bytes required by the TCB, the throughput of the server increases to approximately 8500 HTTP messages per second. In a preferred embodiment, as the reduction is continued to its single cache line limit (e.g., 32 bytes), the throughput increases to approximately 10050 HTTP messages per second.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
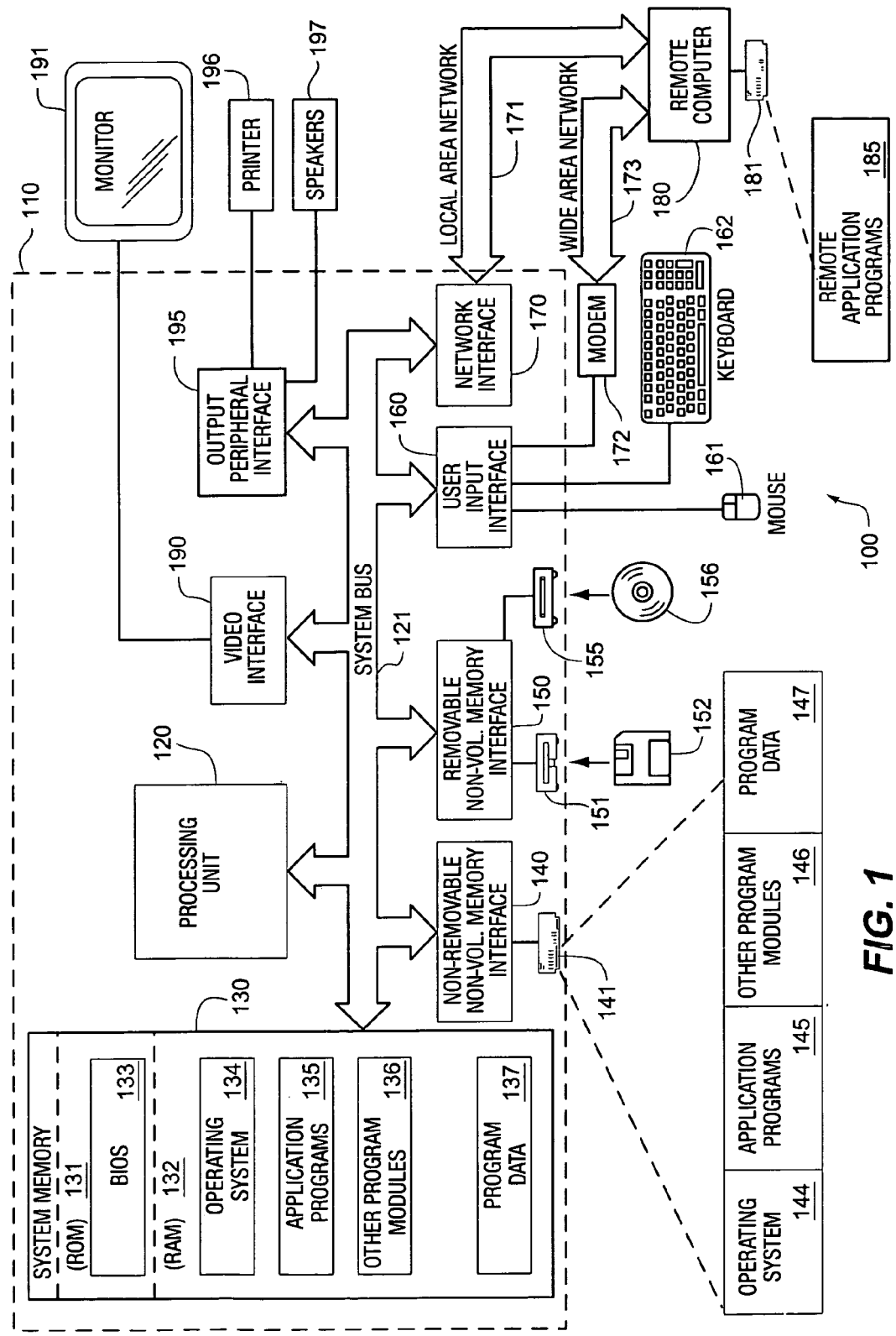
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies.

Optionally, a user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). Optionally, a monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190. Alternatively, the computer 110 may be "headless" and not include any such input or output devices.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In the context of a networked environment, such as that provided via the Internet, wherein transactions are typically characterized as client/server transactions, the systems and methods of the invention are particularly well suited for application on the server side. However, since a server of one transaction may be the client of another, the use of the term server should be taken as a functional designation in a particular transaction. Therefore, as will be recognized by one skilled in the art, the systems and methods of the invention may be embodied in both traditional client machines as well as traditional server machines. Indeed, the systems and methods of the invention may be practiced in a variety of environments that require or desire the performance enhancements provided by these systems and methods.

A measure of this throughput performance of a server known as SPECweb96 has been developed by the Standard Performance Evaluation Corporation (SPEC), and provides a way for administrators of large sites or others seeking to differentiate among the wide variety of server packages available on the market. SPECweb96 establishes a benchmark that can, in many cases, help determine which server software performs best on a particular set of hardware systems and network conditions. This software can evaluate the performance of server software running on virtually any Unix system or Windows NT platform. Like SPEC's other benchmarks, SPECweb96 is a standardized performance benchmark accepted by all interested parties as a fair test of server performance.

A SPECweb96 test bed consists of a server machine that runs the server software to be tested and a set number of client machines. The client machines use the SPECweb96 software to generate a workload that stresses the server software. The workload is gradually increased until the server software is saturated with hits and the response time degrades significantly. The point at which the server is saturated is the maximum number of HTTP operations per second that the server software can sustain. That maximum number of HTTP operations per second is the SPECweb96 performance metric that is reported. The following description will provide the performance improvements made possible by the systems and methods of the present invention for one embodiment thereof. However, these results are presented by way of example of one embodiment of the invention and not by way of limitation.

As discussed above, the establishment of a TCP/IP connection results in the generation of a TCP Transaction Control Block (TCB) in the NPP memory of the server. This TCB stores all of the information necessary to uniquely identify and properly service the TCP/IP connection with the client, and requires typically 400-500 bytes of NPP memory. While this amount of information is necessary to service the connection, once the connection is closed there is no longer any reason to keep all of the information since no further servicing is necessary for this connection. In fact, the TCB information during this time_wait state is used to prevent stale data segments from a previous incarnation of the connection to be mistaken for a new connection, if a new connection is allowed for the same address pairs (source, destination address, and port pairs). Unfortunately, current servers maintain the full TCB for each connection during the entire Time-Wait state, thus tying up precious system resources for the entire Time-Wait period.

Figure 2:
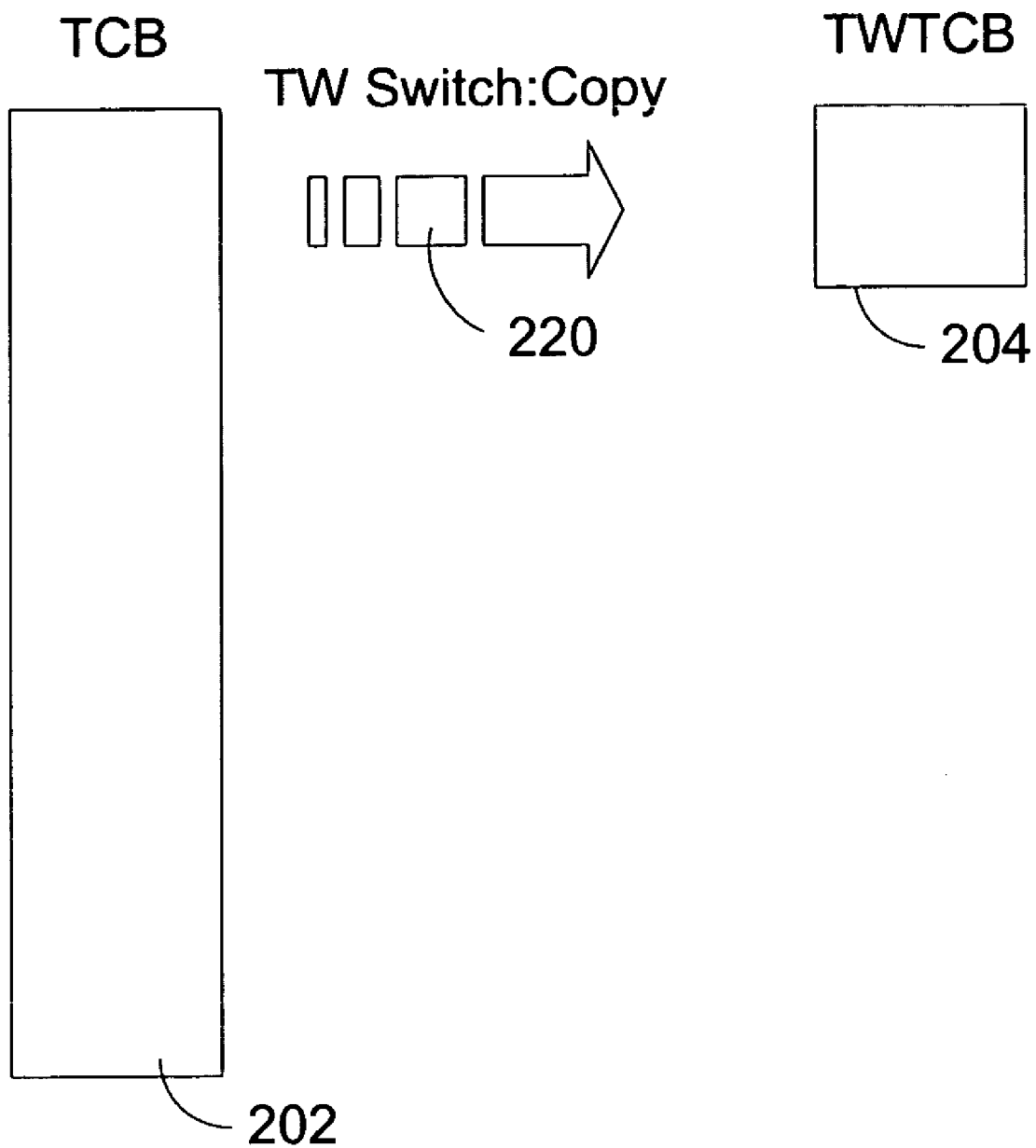
FIG. 2 is a block diagrammatic illustration of the reduction in NPP memory provided by the instant invention as the TCB for a connection is switched to its Time-Wait state and becomes a TWTCB.

The system and method of the invention recognizes that the purpose of maintaining the TCB information for the entire Time-Wait state period can be accomplished without maintaining the full TCB, thus freeing up system resources that may then be used to service additional connections. To accomplish this, the system and method of the invention performs a copy 200 of selected information from the TCB 202 as the connection is switched from active to time-wait state to form the time-wait TCB (TWTCB) 204 as illustrated in FIG. 2. Once the selected information is copied to form the TWTCB 204, the TCB 202 is freed back to the local cache (Slist) for reuse by the server.

In one embodiment of the invention, the reduction of the information for the TWTCB 204 used to uniquely identify the connection results in the usage of only approximately 88 bytes of data (96 bytes total including 8 bytes for the structure itself). As such, the throughput of the server is increased from the prior 4200 HTTP messages per second discussed above to approximately 18200 HTTP messages per second. As will be discussed in greater detail below, further reductions to 56 bytes (64 bytes total including 8 bytes for the structure) for the TWTCB are achievable. Still further, the invention proposes a system and method that allows for the reduction to only a single cache line (32 bytes) for the TWTCB. Such a reduction results in a throughput of approximately 54700 HTTP messages per second.

A structure for one embodiment of the TWTCB of the instant invention is as follows:

```
struct TWTCB {
#ifdef DEBUG
    ulong              twtcb_sig;
#endif
    struct TWTCB       *twtcb_next;
    IPAddr             twtcb_daddr;        // Destination IP address.
    ushort             twtcb_dport;        // Destination port.
    ushort             twtcb_sport;        // Source port.
    uint               twtcb_partition;
    ushort             twtcb_delta;
    ushort             twtcb_rexmittimer;
    Queue              twtcb_TWQueue;      // Place to hold all the
                                              timed_waits
    uint               twtcb_flags;
    IPAddr             twtcb_saddr;        // Source IP address.
    SeqNum             twtcb_senduna;
#if 0 // TRIM_TWTCBREMOVE
    SeqNum             twtcb_sendnext;
#else
    struct TWTCB       *twtcb_prev;
#endif
    SeqNum             twtcb_rcvnext;
    uint               twtcb_phxsum;       // Precomputed pseudo-
                                              header xsum.
    DEFINE_LOCK_STRUCTURE(twtcb_lock)
    //ulong            twtcb_refcnt;
    //SeqNum           twtcb_sendmax;
    //uchar            twtcb_state;        // State of this TCB.
    //RouteCacheEntry  *twtcb_rce;         // RCE for this
                                              connection.
};
```

In this embodiment the TWTCB eliminates the connection state information, send and receive queue information, the routing disconnect indication, the routing information for the connection, etc., that is typically included in the TCB to allow servicing thereof, but that is not needed to merely uniquely identify the connection. While the deleted TCB information is necessary to properly service the Active connection, no servicing is performed in the Time-Wait state, and therefore its inclusion merely serves to take up valuable system resources. The copying of the connection identification information from the TCB to the TWTCB does require some overhead (5 cache lines in one embodiment), but in view of the amount of NPP memory that is released for subsequent utilization to service new connections, this overhead is acceptable.

In another embodiment of the invention, the TWTCB is reduced to a single cache line. Specifically, this embodiment of the invention occupies only 24 bytes for the TWTCB.

With 2 ulongs for allocation, this TWTCB embodiment sits within a single cache line (32 bytes). The structure of this single cache line TWTCB is as follows:

```
struct TWTCB {
#ifdef DEBUG
    ulong            twtcb_sig;
#endif
    struct TWTCB    *twtcb_next;
    IPAddr           twtcb_daddr;      // Destination IP address.
    ushort           twtcb_dport;      // Destination port.
    ushort           twtcb_sport;      // Source port.
    ushort           twtcb_delta;
    ushort           twtcb_rexmittimer;
    IPAddr           twtcb_saddr;      // Source IP address.
//ulong              twtcb_refcnt;
//SeqNum             twtcb_sendmax;
//uchar              twtcb_state;      // State of this TCB.
//RouteCacheEntry   *twtcb_rce;        // RCE for this
                                       connection.
};
```

As will be noted by a comparison of this single cache line TWTCB with the embodiment described previously, several lines have been eliminated. First, it was determined that the line "unit twtcb_partition;" is not needed because the GET_PARTITION macro and the TCB_HASH macro provide all of the address and port information that is needed to uniquely identify the connection. The line "Queue twtcb_TWQueue;" also is not needed because the TWTCB is always accessed walking down the TW Queue in the hot paths, and therefore there is no need to know the previous part of the queue for the hot path. Only the Queue header needs to know the last element. The occasional paths (like ReInsert2MSL/Scavenge etc.) can walk the queue without a requirement for this information.

The line "unit twtcb_flags;" may also be deleted when the TWTCB is copied from the TCB because the function RemoveAndinsert sets these flags, and the functions RemoveTWTCB and ReInsert2MSL resets these. All the asserts can be removed, and the partition lock is always held when these three functions are initiated. Since the TWTCB will always be in the table and, therefore, in the queue until it is removed by the timeout, these flags are not needed to uniquely identify the connection to prevent late routed packets from establishing a new connection. In an alternate embodiment, the TWTCB does not include a separate field for the twtcb_flags. Since the maximum values are 3000 each (Fin Wait2TO maximum is 300*10), 12 bits of delta and rexmittimer may be packed into a ulong. This leaves 8 bits that may be used for 2 flags that are used. If the 0 msec timer is ever reached, the maximum is still only 15 bits. Therefore, 15+15 may still be packed into a ulong, which still leaves two bits left over for 2 flags.

Further reductions to the TWTCB to allow its residence on a single cache line include the deletion of the line "SeqNum twtcb_senduna;". This line may be removed because when a client sends a FIN/ACK, the ack is exactly this number. Therefore, this information may be taken from there. Additionally, the line "SeqNum twtcb_sendnext;" may be deleted since this value is the same as the "senduna" just discussed, and since it is not used in *.c except for assignment. The line "SeqNum twtcb_rcvnext;" may also be deleted since it is also included in the incoming FIN/ACK frame. As a further reason why this may be deleted, the TWTCB does not receive anything, and therefore this information is superfluous. The line "unit twtcb_phxsum;" may also be deleted from this embodiment of the single cache line TWTCB since it can be recomputed as needed. The line "DEFINE_LOCK_STRUCTURE(twtcb_lock)" may also be deleted because every where this lock is held, the table partition lock is held also (except ReadNextTCB, which is an occasional occurrence).

In this embodiment of the TWTCB constructed in accordance with the teachings of the invention, 8 ulongs or 32 bytes can be saved in the required allocation as described above and still uniquely identify the connection previously serviced with the TCB. With these additional savings, the size of the TWTCB is only 24 bytes. Even including the 2 ulongs for the allocation, this embodiment of the small TWTCB sits within a single cache line, occupying only 32 bytes total. Such a small TWTCB allows the server throughput to increase to approximately 55,125 HTTP messages per second, as compared to approximately 4,200 HTTP messages per second when the TWTCB is approximately 440 bytes. This embodiment also allows an increase in the number TCBs in timed-wait state to 3,125,000 TCBs, as opposed to only 252,000 when the entire TCB is placed in timed-wait state.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of increasing throughput of a server capable of servicing at least one TCP/IP connection with a client, the server creating a TCP/IP Transmission Control Block (TCB) stored in non-paged pool (NPP) memory containing information required to identify and to service the client connection, comprising:
   closing a TCP/IP connection between said client and said server;
   excluding information from the TCB not required to identify the client connection to form a timed-wait state TCB (TWTCB) for a time-wait period; and
   releasing the NPP memory containing the information required to service the client connection;
   wherein excluding information includes excluding connection state information, send and receive queue information, a routing disconnect indication, and a routing information for the connection.

2. The method of claim 1, wherein the step of excluding comprises the step of copying the information required to identify the client connection to form the TWTCB.

3. The method of claim 2, wherein the step of releasing the NPP memory containing the information required to service the client connection includes the step of releasing the NPP memory of the TCB required to identify the client connection.

4. The method of claim 1, wherein the step of excluding information not required to identify the client connection to form the TWTCB comprises the step of maintaining a minimum of information necessary to avoid late-routed packets forming new connections on the server.

5. The method of claim 1, wherein the step of excluding information not required to identify the client connection comprises the step of forming a TWTCB that occupies less memory than the TCB.

6. The method of claim 5, wherein the step of forming a TWTCB that occupies less memory than the TCB comprises the step of forming a TWTCB that occupies approximately 96 bytes of memory.

7. The method of claim 5, wherein the step of forming a TWTCB that occupies less memory than the TCB comprises the step of forming a TWTCB that occupies approximately 64 bytes of memory.

8. The method of claim 5, wherein the step of forming a TWTCB that occupies less memory than the TCB comprises the step of forming a TWTCB that occupies approximately a single cache line.

9. A method for increasing the throughput of a server capable of servicing at least one TCP/IP connection, the server establishing a TCP/IP Transmission Control Block (TCB) of a size and containing information sufficient to identify and service the connection with a client, comprising:

closing the at least one TCP/IP connection between said client and said server;

forming a Timed-Wait TCB (TWTCB) of a size less than the TCB; and excluding information from the TCB not required to identify the client connection to form a timed-wait state TCB (TWTCB) for a time-wait period;

releasing the TCB for use by the server;

wherein excluding information includes excluding a connection state information, send and receive queue information, a routing disconnect indication, and a routing information for the connection.

10. The method of claim 9, wherein the step of forming a TWTCB comprises the step of copying a portion of the information of the TCB, the portion of information being sufficient to identify the TCP/IP connection to prevent late routed packets from forming new connections.

11. The method of claim 10, wherein the TCB occupies approximately 440 bytes of memory, and wherein the step of forming a TWTCB comprises the step of forming a TWTCB that occupies approximately 206 bytes of memory.

12. The method of claim 10, wherein the TCB occupies approximately 440 bytes of memory, and wherein the step of forming a TWTCB comprises the step of forming a TWTCB that occupies approximately 32 bytes of memory.

13. The method of claim 9, wherein the step of forming a TWTCB comprises the step of copying a portion of the information of the TCB, the portion of information being insufficient to service the TCP/IP connection.

14. A computer readable medium storing computer-executable instructions for servicing at least one TCP/IP connection with a client and a server, the server creating a TCP/IP Transmission Control Block (TCB) stored in non-paged pool (NPP) memory containing information required to identify and to service the client connection, said computer executable instructions when executed perform steps comprising:

closing a TCP/IP connection;

excluding information from the TCB not required to identify the client connection to form a timed-wait state TCB (TWTCB) for a time-wait period; and releasing the NPP memory containing the information required to service the client connection;

wherein excluding information includes excluding connection state information, send and receive queue information, a routing disconnect indication, and a routing information for the connection; and wherein copying less than all information includes excluding a connection state information, send and receive queue information, a routing disconnect indication, and a routing information for the connection.

15. The computer-readable medium of claim 14, wherein the step of copying less than all the information stored in a TCB into a TWTCB comprises the step of copying information sufficient to uniquely identify the TCP/IP connection.

16. The computer-readable medium of claim 14, further comprising the step of releasing memory used to store the TCB for use by the server after the step of copying less than all of the information stored in the TCB into a TWTCB.

17. The computer-readable medium of claim 14, wherein the step of copying less than all the information stored in a TCB into a TWTCB results in a structure for the TWTCB that fits on one cache line.

\* \* \* \* \*